March 17, 1964 T. M. McDONNELL 3,124,958
GOLF STROKE MEASURING DEVICE
Filed July 17, 1962

INVENTOR.
Thomas M. McDonnell
BY
Richard W. Carpenter, Atty.

United States Patent Office 3,124,958
Patented Mar. 17, 1964

3,124,958
GOLF STROKE MEASURING DEVICE
Thomas Michael McDonnell, 836 S. Ridgeland Ave.,
Oak Park, Ill.
Filed July 17, 1962, Ser. No. 210,409
7 Claims. (Cl. 73—380)

This invention relates to measuring devices, and more particularly to a device for measuring the force of a golfer's stroke.

The invention comprehends an arrangement for a measuring device which utilizes centrifugal force in calibrating the force of a golfer's stroke or swing.

Although many devices have been produced and sold for use by golfers for practicing their strokes or swings and for measuring the force of such strokes, most of these devices involve complex mechanisms which are expensive to produce and also require delicate measuring instruments of a fragile or complicated nature.

It is therefore a primary object of this invention to provide a device of simple design and construction for use by a golfer in practicing his swing or stroke and for measuring the force thereof.

Another object of the invention is the provision, in a device of the type described, of a simple and uncomplicated mechanism which utilizes the principle of centrifugal force in its operation.

A more specific object of the invention is the provision, in a device of the type described, of a rotatable, pivotally supported, golf ball carrying arm having a slidable marker and a spring carried, marker actuating weight which is moved on the arm by the centrifugal force of the rotating arm as the ball is struck by a golfer.

These and other objects of the invention will be apparent from an examination of the following description and drawings, wherein.

It will be understood that, for purposes of clarity, certain elements have been intentionally omitted from certain views where they are illustrated to better advantage in other views.

Figure 1:
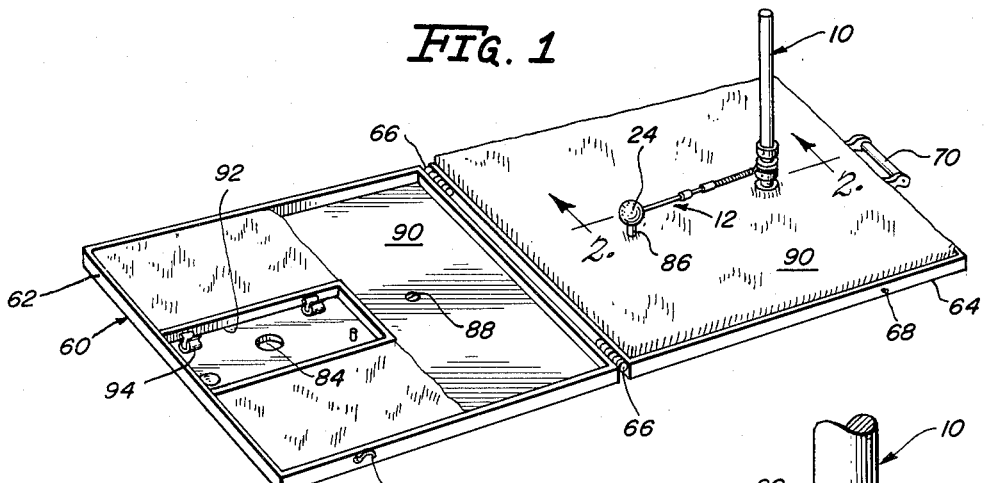
FIGURE 1 is a perspective view of a golf stroke measuring device embodying features of the invention.
Figure 2:
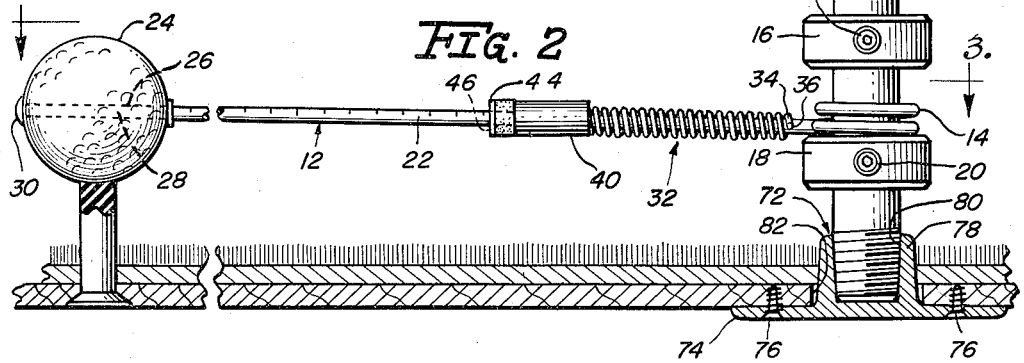
FIGURE 2 is an enlarged vertical section taken on line 2—2 of FIGURE 1, with the marker shown in its position before a stroke is taken.
Figure 3:
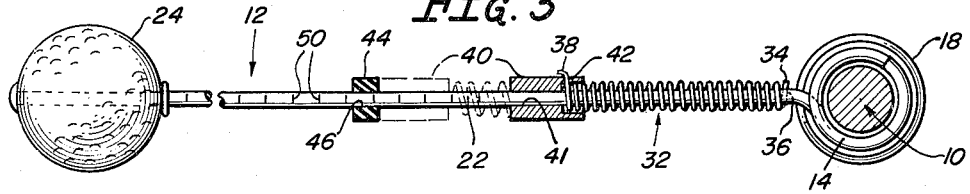
FIGURE 3 is a horizontal section taken on line 3—3 of FIGURE 2, but with the marker shown in its position after a stroke has been taken.

Referring now to the drawing for a better understanding of the invention, and particularly to FIGURES 1–3, it will be seen that the device of the invention includes a vertical column or post 10 which is stationary and preferably cylindrical in shape.

The manner of mounting the post is optional and will be described later in the specification.

Extending laterally from post 10, at a location spaced a relatively short distance above the base or ground level, is a horizontally disposed arm 12.

At its inboard end arm 12 may be provided with an integral loop 14 loosely sleeved over post 10 to accommodate the free rotation of the arm, relative to the post, in a generally horizontal plane. In order to facilitate the removal of the arm from the post, the latter may be provided with a pair of upper and lower retaining collars 16 and 18 respectively which are disposed on opposite sides of arm loop 14 and which may be provided with set screws 20 to facilitate their positioning on and removal from the post.

The body or shank 22 of arm 12 is preferably cylindrical in section with the outboard end of the arm being disposed to extend through a snugly fitting passageway 26 of a golf ball 24. At its outboard extremity the body of arm 10 may be provided with a threaded portion 28 adapted to receive a nut 30 for securing the ball to the arm. The particular means for attaching the ball to the outboard end of the arm is not of any appreciable significance as far as this invention is concerned.

As best seen in FIGURE 2, there may be sleeved over arm 12, a coil spring 32, the inboard end of which is attached to the inboard end of the arm in any desired manner, such as by having the inboard end 34 of the spring disposed to extend into opening 36 in the inboard end of the arm. The outboard end 38 of the spring is free from attachment to the arm so as to be freely slidable longitudinally thereon.

Attached to the outboard end 38 of spring 32 is a weight 40 which is preferably in the form of a cylindrical sleeve with an axial bore 41 extending therethrough to slidably receive the body 22 of arm 12.

Weight 40 may be provided with an opening or groove 42 for receiving the outboard end 38 of spring 32 to accommodate attachment of the weight to the spring.

Outboardly of weight 40 there is mounted a marker 44 with an axial bore 46 extending therethrough to slidably receive arm body or shank 22. Marker 44 is also preferably in the form of a cylindrical sleeve and is preferably formed of a light weight material such as rubber or plastic. The relationship of the marker bore diameter to the diameter of arm body 22 is such that will permit the marker to slide freely enough on the arm body, so that it will not slow down or decrease the movement of the weight as the weight moves outwardly, but at the same time will be snug enough to prevent the marker from accidentally moving in either direction on the arm body without being actuated by the weight.

In order to operate the device, marker 44 is pushed inboardly up against the outboardly facing end of weight 40, as shown in FIGURE 2. The ball and arm are then moved to position and the golfer swings a golf club and strikes the ball in the same manner as if he were hitting a free ball off a tee on a golf course.

The resulting impact causes the ball and arm to pivot about the post, and as this occurs centrifugal force will cause weight 40 to slide in an outboard direction on the arm moving marker 44 with it. As soon as arm 12 stops rotating about post 10 the action of the centrifugal force will stop and the spring will retract returning the weight to its original position, as shown in FIGURE 2, while the marker remains in its new position, as shown in FIGURE 3.

As the magnitude of the centrifugal force will be in direct proportion to the magnitude of the force of the stroke, the latter can be determined by the distance of movement of the marker on the arm. In order to determine this with some degree of accuracy, the arm may be provided with a plurality of longitudinally spaced marks or lines 50, the spacing of which has been determined by previous calculations based on the size, weight, tensile strength, and other necessary factors.

After a golfer has completed a stroke and has noted the position of the marker, the marker is merely pushed inboardly on the arm until it is again in abutting engagement with the outboard side of the weight, as shown in FIGURE 2, and the cycle may be repeated.

In the preferred embodiment of FIGURES 1–3, the device is detachably mounted on a collapsible platform, indicated generally at 60, which comprises a pair of left and right hand mating sections 62 and 64, respectively, hingedly attached along adjacent side edges by one or more hinges 66. Thus the separate sections can be folded together to form a compact carrying unit. Along their edges the platform sections may be provided with conventional latch devices 68 to lock them together when the platform is folded to closed position. Also, one of the platform sections may be provided with a handle 70 to facilitate carrying.

To accommodate the detachable mounting of post 10 to section 64 of platform 60, the latter may be provided with a mounting member or base 72 having a generally flat flange portion 74 permanently affixed thereto in any desired manner, such as by means of screws 76. Projecting upwardly from flange portion 74 of the base is an integral sleeve or collar portion 78 having an axial bore 80 which may be threaded for threadable engagement with the lower end of post 10.

By this arrangement, the post can be easily and quickly attached to or removed from the platform. For greater rigidity, base 72 can be mounted with its flange portion affixed to the under or outside surface of platform section 64, with the base collar portion 78 projecting upwardly through an aligned aperture 82 in the platform sections to be folded together, section 62 may be provided with an aperture 84 disposed in alignment with aperture 82 to receive the upper portion of collar 78 when the platform is folded to closed position.

In order to support golf ball 24, platform section 64 may be provided with a tee 86, preferably formed of rubber or some comparable resilient material, and permanently mounted, in any desired manner in platform section 64 at the end of arm 12. Platform section 62 may be provided with an aperture 88 disposed to receive the upwardly projecting portion of tee 86 when the platform is folded to closed position.

If desired, platform 64 and all or a portion of platform 62 may have permanently secured to the upper surfaces thereof a rug or carpeting 90 for the purpose of simulating the grass or turf of a golf course.

Also, as a convenience, platform section 62 may be provided with a recessed area 92 in which are positioned various clips 94 of any desired type for holding the post 10 and arm 12, when they have been removed from platform section 64, to permit folding of the platform into closed position.

Thus it will be seen that the invention includes a completely collapsible and portable arrangement for retaining and mounting the golf stroke force measuring device of the invention to permit its use anywhere.

Figure 4:
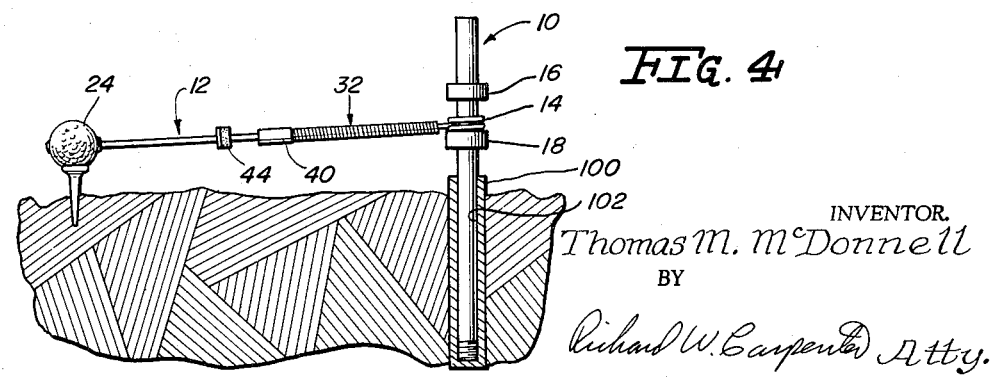
FIGURE 4 is a view similar to FIGURE 1, but illustrating a modified form of the invention.

Referring now to FIGURE 4 of the drawing, it will be seen that a modified embodiment of the invention is shown. In this embodiment, the platform arrangement is eliminated, and post 10 is mounted in a base member 100 which in turn is permanently mounted in the ground.

Base 100 is preferably in the form of a hollow, cylindrical sleeve or pipe having a central bore 102 adapted to receive the lower portion of post 10. If desired the telescoping portions of base 100 and post 10 may be provided with mating threaded portions.

Although the arrangement of the embodiment illustrated in FIGURE 4 lacks the portability feature, of the embodiment illustrated in FIGURES 1-3, it is a much simpler arrangement, and, of course, is less expensive to produce. The arrangement and operation of the arm, spring, weight, and marker mechanisms of each embodiment will operate in exactly the same manner.

I claim:
1. A device for measuring the force of a golfer's stroke, comprising:
   (a) a vertically disposed post;
   (b) a laterally disposed arm having an inboard end pivotally connected to said post;
   (c) a golf ball mounted at an outboard end of said arm;
   (d) spring means movably mounted on said arm and having an inboard end fixed with respect to the inboard end of said arm; and
   (e) a marker movably mounted on said arm and abuttably engageable with said spring means for movement therewith, so that when the ball is struck causing the arm to pivot about the post, centrifugal force will cause the spring means to move said marker outboardly on the arm;
   (f) said marker being free from positive attachment to said spring means, so that when the centrifugal force terminates and the spring means returns to its original position on said arm, the marker will remain in its outboardmost position; and
   (g) means for mounting said post in a fixed vertical position;
   (h) said mounting means including a horizontal platform for supporting the weight of the golfer.
2. A device according to claim 1, wherein said arm has a plurality of longitudinally spaced markings thereon for use in the calibration of the force of said stroke.
3. A device according to claim 1, wherein said mounting means includes a hollow vertically disposed tube having a bore adapted to receive a lower portion of said post in snugly fitting engagement.
4. A device according to claim 1, wherein said mounting means are readily, detachably connected to said post.
5. A device according to claim 1, wherein said platform includes the means for positioning said ball at a predetermined elevation.
6. A device according to claim 1, wherein said platform is collapsible and includes a pair of sections hingedly connected to each other.
7. A device according to claim 6, and including handle means on at least one of said sections.

References Cited in the file of this patent
UNITED STATES PATENTS

| | | |
|---|---|---|
| 2,641,933 | Van Kinkle | June 16, 1953 |
| 2,780,098 | Maroth | Feb. 5, 1957 |